(12) United States Patent
Alaura et al.

(10) Patent No.: US 10,873,169 B2
(45) Date of Patent: *Dec. 22, 2020

(54) DOUBLE-ENDED LAMP SOCKET SYSTEM AND METHOD OF USE

(71) Applicant: Barron Lighting Group, Glendale, AZ (US)

(72) Inventors: Gregory Alaura, Peoria, AZ (US); Aubrey Bradley, Phoenix, AZ (US); Richard Goeldi, Glendale, AZ (US); Henri Lozano, Glendale, AZ (US)

(73) Assignee: Barron Lighting Group, Glendale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/917,031

(22) Filed: Jun. 30, 2020

(65) Prior Publication Data

US 2020/0335922 A1  Oct. 22, 2020

Related U.S. Application Data

(63) Continuation of application No. 16/203,325, filed on Nov. 28, 2018, now Pat. No. 10,720,741.

(Continued)

(51) Int. Cl.
*H01R 33/08* (2006.01)
*H01R 33/975* (2006.01)
(Continued)

(52) U.S. Cl.
CPC ......... *H01R 33/0827* (2013.01); *A01G 7/045* (2013.01); *F21V 7/08* (2013.01);
(Continued)

(58) Field of Classification Search
CPC .. H01R 33/0827; H01R 33/975; H01R 33/02; A01G 7/045; F21V 7/08; F21V 7/005;
(Continued)

(56) References Cited

U.S. PATENT DOCUMENTS

| | | | | |
|---|---|---|---|---|
| 8,333,602 B2* | 12/2012 | Galluccio | .......... | H01R 33/0836 439/241 |
| 2009/0068869 A1* | 3/2009 | Brand | ................ | H01R 33/0827 439/226 |
| 2010/0081339 A1* | 4/2010 | Galluccio | .............. | H01R 33/08 439/699.2 |

OTHER PUBLICATIONS

Alaura et al., Double-Ended Lamp Socket System and Method of Use, Patent Cooperation Treaty Application Serial No. PCT/US19/63732, filed Nov. 27, 2019, International Search Report and Written Opinion dated Apr. 1, 2020.

* cited by examiner

*Primary Examiner* — Mary Ellen Bowman
(74) *Attorney, Agent, or Firm* — Schmeiser, Olsen & Watts LLP (57) ABSTRACT

A double-ended socket system for safely and easily seating a double-ended lamp is disclosed. The system has two socket assemblies spaced a distance corresponding to the length of a double-ended lamp. Each socket assembly has a housing with a recess that houses a cylindrical socket for receiving a lamp end that rotates between a disengaged orientation and an engaged orientation. The housing has an attached electrical connector connected to a power source. The socket has another attached electrical connector that contacts the electrical connector of the housing only when the socket is rotated to the engaged orientation, thus eliminating the electrical shock hazard of conventional double-ended socket systems. The lamp may be removed only while in the disengaged orientation. A user may install a double-ended lamp into the socket system by use of only one hand. A method of use of a double-ended socket system is also disclosed.

4 Claims, 12 Drawing Sheets

Related U.S. Application Data (60) Provisional application No. 62/591,639, filed on Nov. 28, 2017.

(51) Int. Cl.
  *F21V 19/00* (2006.01)
  *F21V 25/02* (2006.01)
  *A01G 7/04* (2006.01)
  *F21V 7/08* (2006.01)
  *F21V 23/02* (2006.01)
  *H01R 33/02* (2006.01)
  *F21V 7/00* (2006.01)
  *F21V 7/10* (2006.01)
  *F21V 15/01* (2006.01)

(52) U.S. Cl.
  CPC ............ *F21V 19/008* (2013.01); *F21V 25/02* (2013.01); *H01R 33/975* (2013.01); *F21V 7/005* (2013.01); *F21V 7/10* (2013.01); *F21V 15/01* (2013.01); *F21V 23/026* (2013.01); *H01R 33/02* (2013.01)

(58) Field of Classification Search
  CPC .......... F21V 7/10; F21V 19/008; F21V 25/02; F21V 15/01; F21V 23/026
  See application file for complete search history.

DOUBLE-ENDED LAMP SOCKET SYSTEM AND METHOD OF USE

CROSS REFERENCE TO RELATED APPLICATION

This application is a Continuation of U.S. patent application entitled "DOUBLE-ENDED LAMP SOCKET SYSTEM AND METHOD OF USE," Ser. No. 16/203,325, filed on Nov. 18, 2018 which claims priority to U.S. Provisional Patent Application entitled "LAMP REFLECTOR, BULB, AND SAFETY SOCKET," Ser. No. 62/591,639, filed Nov. 28, 2017, the disclosures of which are hereby incorporated entirely herein by reference.

BACKGROUND OF THE INVENTION

Technical Field

This invention relates generally to lighting products, and particularly to double-ended socket system for safely and easily seating a double-ended lamp.

State of the Art

Any of a variety of existing double-ended high-intensity discharge (HID) lamps, such as double-ended high-pressure sodium (HPS) or metal halide (MH) lamps, for example, comprises an elongated glass tubular bulb containing an arc tube assembly. The lamp further comprises first and second electrical wire leads, protruding from opposed first and second ends of the bulb, respectively. Light emanates from the arc tube assembly in response to an electrical current passing therethrough when the lamp is secured into a double-ended socket assembly, thereby completing a closed circuit with a power source.

One problem with conventional double-ended socket assemblies is that they pose significant risk of electrical shock to a user while installing a double-ended lamp therein. For example, a user may install a first end of a double-ended lamp, such that the first electrical wire lead engages an electrical contact within the first socket, which is coupled to the power source, thereby electrically energizing the second electrical wire lead at the second end of the double-ended lamp. Since the second end of the double-ended lamp is exposed, having not yet been installed, the user is at risk of receiving a potentially life-threatening electrical shock by touching the exposed and electrically-energized second electrical wire lead.

A second problem with conventional double-ended socket assemblies is that they allow for possible incorrect installation of a double-ended lamp, resulting in risk of electrical arc discharge, when energized. The opposed first and second ends of the bulbs of existing double-ended HID lamps have first and second flat end portions thereof, respectively, that are intended to lie horizontally within conventional double-ended socket assemblies, when installed correctly. Unfortunately, it is possible to incorrectly install such a lamp with the flat end portions lying vertically within the socket assemblies, such that the electrical wire leads thereof are close to, but not actually in contact with, the electrical contacts within the sockets, thereby creating conditions for electric arc discharge when energized. Alternatively, conventional double-ended socket assemblies allow for the electrical wire leads to be bent or curled during installation, even when installed with the flat end portions of the bulb lying horizontally, similarly creating conditions for electric arc discharge when energized. Such electric arc discharge may cause a fire, charring or burning of the socket assembly or other components of the luminaire.

A third problem with conventional double-ended socket assemblies is that they require the use of two hands of a user for installation of a double-ended lamp. Typically, a user must hold the lamp in place with one hand while the other hand slides or closes a sliding or hinged retention component of a socket to secure a first end of the lamp, and then repeat for the second end of the lamp. Often, it is desirable for a user to be able to safely and easily install a double-ended lamp with use of only one hand.

Accordingly, what is needed is a double-ended socket assembly for receiving a double-ended lamp that may be installed therein by a user, without risk of electrical shock or electrical arc discharge, and with use of only one hand.

SUMMARY OF THE INVENTION

The present invention relates generally to lighting products, and particularly to a double-ended socket system for safely and easily seating a double-ended lamp, such as a double-ended high intensity discharge (HID) lamp.

Embodiments of a double-ended socket system comprise a first socket assembly and a second socket assembly spaced a distance apart from each other corresponding to the length of a double-ended lamp. The first and second socket assemblies may be coupled to a light fixture, or to another suitable mounting support or component of a luminaire.

In embodiments, each of the first and second socket assemblies comprises a housing having a recess therein for housing a socket of substantially cylindrical shape such that the socket may be rotated within the recess between a disengaged orientation and an engaged orientation. The socket is configured to seat an end of a double-ended lamp, wherein the end of the lamp may rotate the socket in response to a user rotating the lamp.

In operation, a user may grasp the lamp and thereby insert the ends thereof into the sockets for seating the lamp. In some embodiments, the sockets cannot be rotated from a disengaged orientation to an engaged orientation unless both ends of the lamp are seated within the sockets. Embodiments thus allow a user to grasp a double-ended lamp and easily install it to a double-ended socket system using only one hand and without the use of any tools. One-handed removal of the lamp from the socket system is likewise easy to perform by reverse motion.

A power contact may be coupled to the housing and coupled to a first end of a power supply wire, wherein a second end of the power supply wire is coupled to a power supply. A main contact may be coupled to the socket, such that the main contact engages the power contact while in the engaged orientation and the main contact does not engage the power contact while in the disengaged orientation.

In operation, the lamp is not energized while seated in the sockets in the disengaged orientation. In such embodiments, it is only when the user rotates the lamp, such that the sockets rotate to the engaged orientation, that a circuit is competed to energize the lamp to emit light. The lamp may thereby be prevented from otherwise becoming energized, thus eliminating a risk of electrical shock of conventional systems.

In embodiments, each of the first and second socket assemblies is configured such that the electrical wire lead of the end of the lamp is held straight and in contact with the main contact thereof, thus eliminating a risk of electric arc discharge of conventional systems.

In embodiments, the lamp may only be installed or removed when the socket is in the disengaged orientation. In some embodiments, the socket may further comprise a cover, hingedly coupled to the socket, such that the cover may rotate between an open orientation and a closed orientation, wherein the end of the lamp may be seated into the socket while the cover is open, and the cover may be closed over the end of the lamp to prevent removal of the lamp while the cover is closed. In such embodiments, the cover may be closed by contact of the cover with the housing, upon rotation of the lamp by the user, such that the lamp cannot be removed once the socket is rotated beyond a minimum angle from the disengaged orientation because the cover will be closed, thereby preventing the lamp from being removed.

Each of the first and second socket assemblies may further comprise a snapping mechanism for snapping the socket into the engaged orientation or the disengaged orientation.

A method of using a double-ended socket system is also disclosed.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in conjunction with the Figures, wherein like reference numbers refer to similar items throughout the Figures, and:

DETAILED DESCRIPTION OF EMBODIMENTS OF THE INVENTION

As discussed above, embodiments of the present invention relate generally to lighting products, and particularly to a double-ended socket system for safely and easily seating a double-ended lamp, such as a double-ended high intensity discharge lamp.

Figure 1:
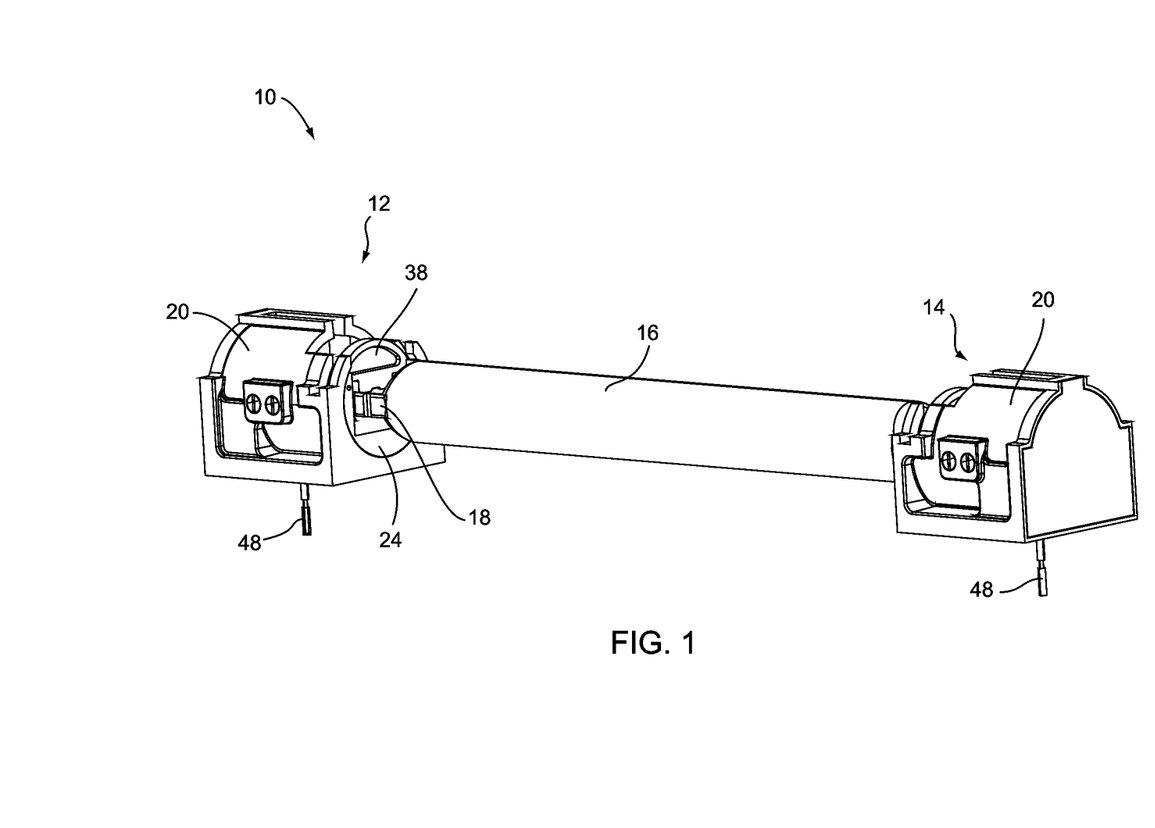
FIG. 1 is a perspective view of a double-ended lamp socket system according to an embodiment.
Figure 3:
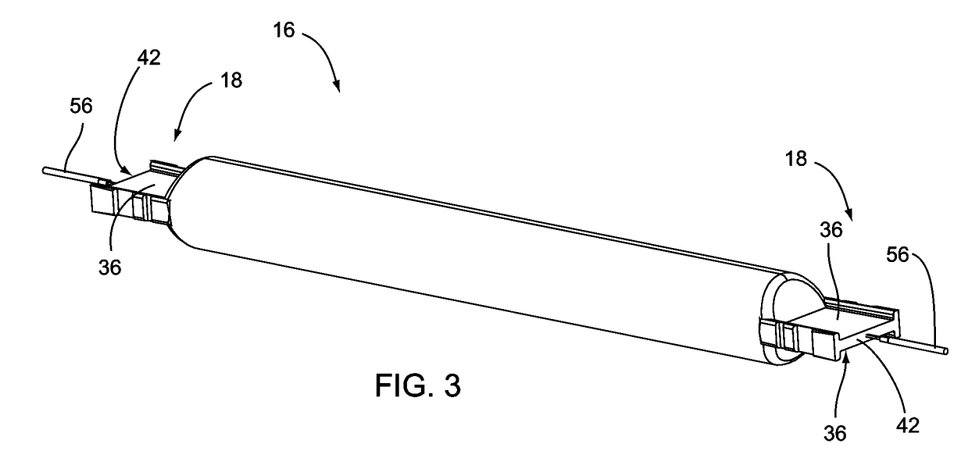
FIG. 3 is a perspective view of a conventional double-ended HID lamp.

Referring to the drawings, as shown in FIG. 1, embodiments of a double-ended lamp socket system 10 comprise a first socket assembly 12 and a second socket assembly 14. The first and second socket assemblies, 12 and 14, may be coupled to a light fixture, or to another suitable mounting support or component of a luminaire, at a spaced distance apart from each other corresponding to the length of a double-ended lamp 16, such as, for example, a double-ended high-intensity discharge (HID) lamp, which may be, for example, a high-pressure sodium (HPS), or a metal halide (MH) lamp. The first and second socket assemblies, 12 and 14, are each of the same components and design, being disposed at opposite ends of the lamp 16. A conventional double-ended HID lamp 16 is shown in FIG. 3.

As shown in FIGS. 2-7, in embodiments, each of the first and second socket assemblies, 12 and 14, comprises a housing 20 having a substantially cylindrical recess 22 therein for housing a socket 24. The socket 24 may be of substantially cylindrical shape and housed within the recess 22 of the housing 20 such that the socket 24 is free to rotate about the longitudinal axis thereof within the recess 22 between a disengaged orientation, as shown in FIG. 7A, and an engaged orientation, as shown in FIG. 7C.

Figure 8:
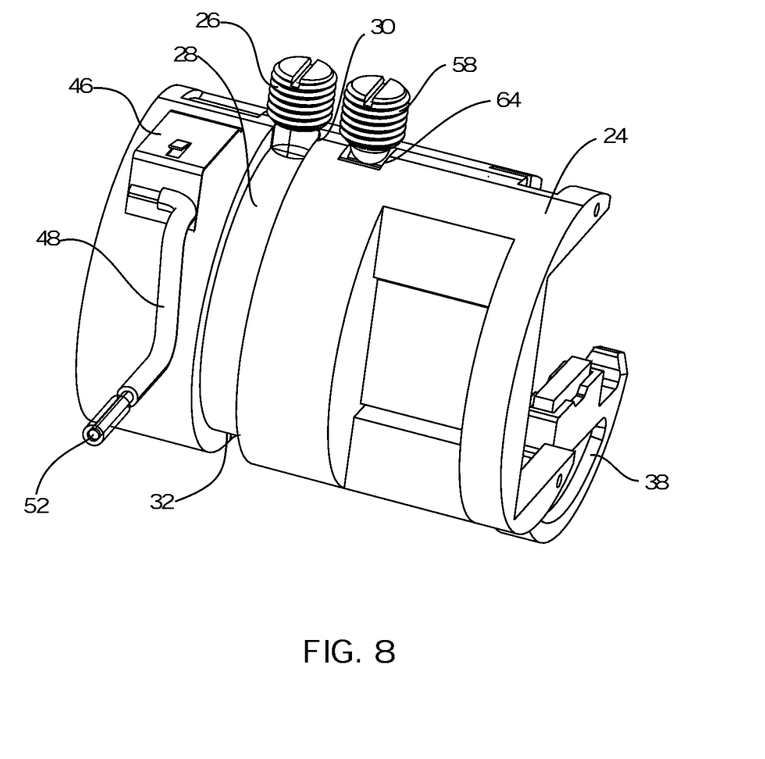
FIG. 8 is a perspective view of a socket assembly with the housing removed according to an embodiment.

FIG. 8 is a perspective view of a socket assembly 12, according to an embodiment, with the housing 20 removed in order to show interior components of the socket assembly 12. In some embodiments, as shown in FIG. 8, each of the first and second socket assemblies, 12 and 14, may further comprise a pin 26 coupled to the housing 20 and extending into a slot 28 disposed about a circumference of the socket 24. The slot 28 may be limited in length, wherein the slot 28 only partially circumscribes the socket 24, thereby limiting the range of rotation of the socket 24 within the housing 20. For example, in some embodiments, the slot 28 may extend substantially 180 degrees around the socket 24, such that rotation of the socket 24 within the housing 20 is limited to 180 degrees by the pin 26 extending within the slot 28, such that the pin 26 engages a first end 30 of the slot while in the disengaged orientation and the pin 26 engages a second end (not shown) of the slot 28 while in the engaged orientation.

Although rotation of the socket 24 within the housing 20, in some embodiments, is described as being limited by a pin 26 coupled to the housing 20 and extending into a slot 28 in the socket 24, this is not intended to be limiting. It should be understood that any of a variety of mechanisms may be employed to limit the range of the rotation of the socket 24 within the housing 20, such as by a lip (not shown) protruding from the socket 24 that engages a pair of stops (not shown) on the housing 20 at either end of a range of rotation, and the like.

Figure 4:
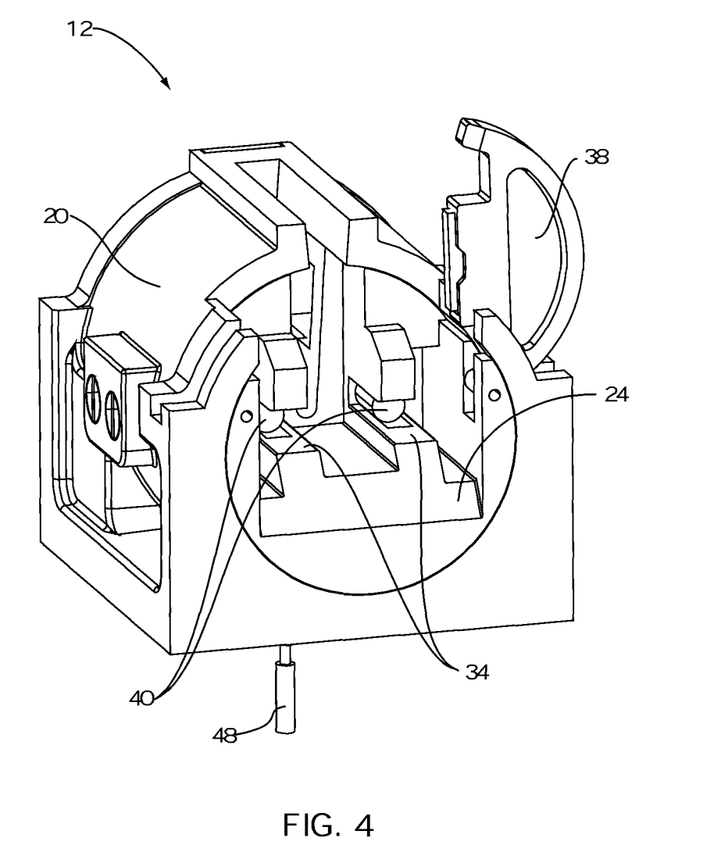
FIG. 4 is a front perspective view of a socket assembly according to an embodiment.
Figure 5A:
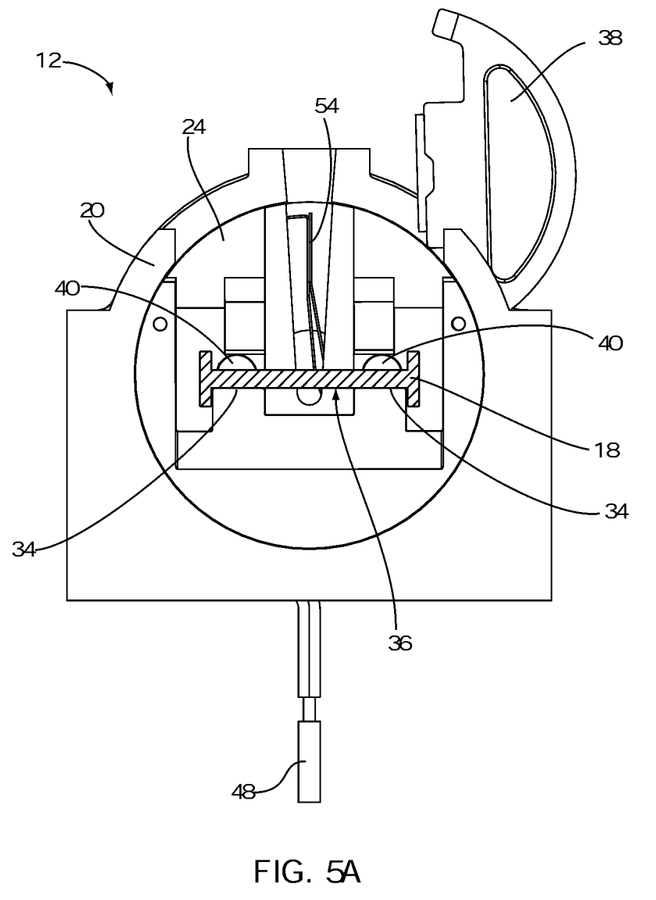
FIG. 5A is a front view of a socket assembly according to an embodiment.
Figure 5B:
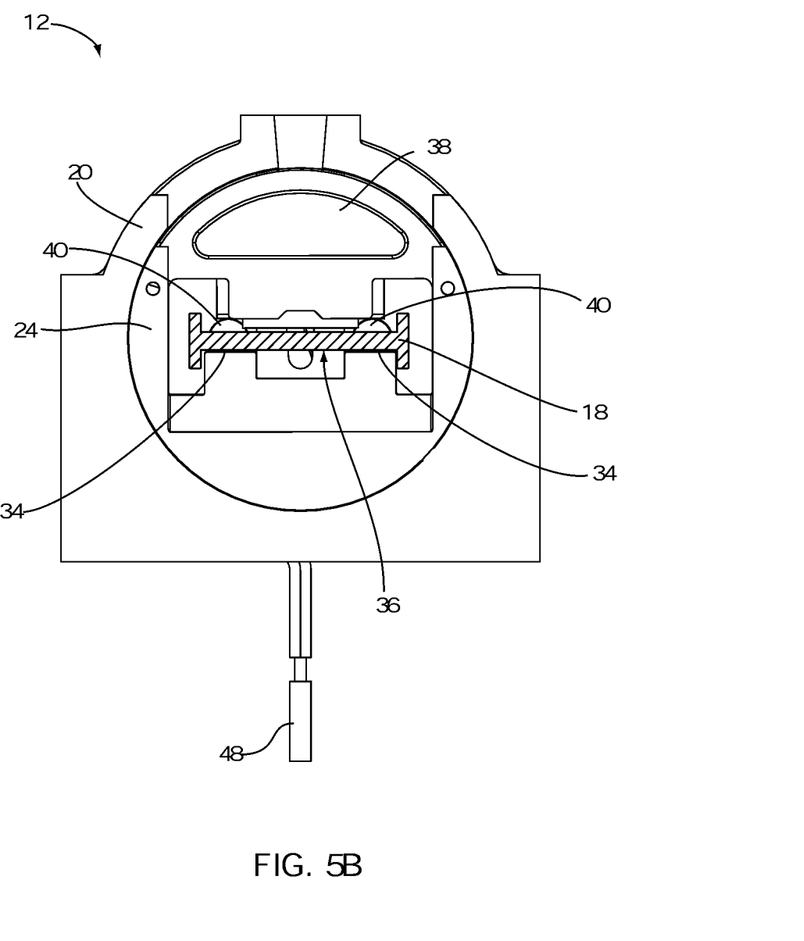
FIG. 5B is an alternative front view of a socket assembly according to an embodiment.
Figure 6:
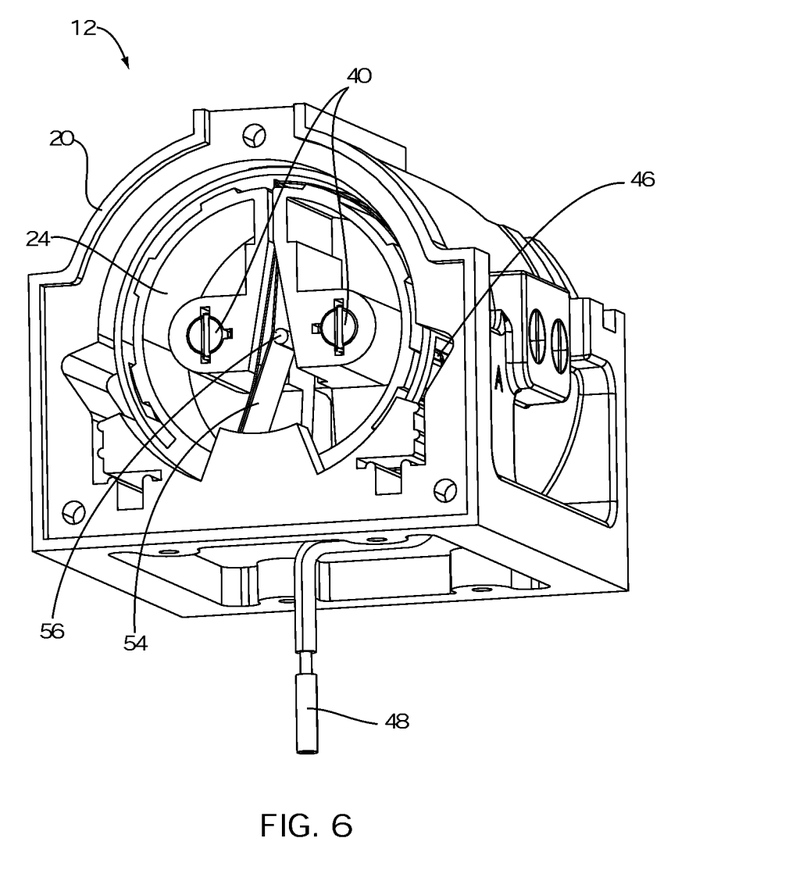
FIG. 6 is a rear perspective view of a socket assembly according to an embodiment.

As shown in FIG. 1, the socket 24 may be configured to seat an end 18 of a double-ended lamp 16 such that the longitudinal axis of the lamp 16 is substantially aligned with the longitudinal axis of the socket 24, wherein the end 18 of the lamp 16 may rotate the socket 24 in response to a user rotating the lamp 16. For example, as shown in FIGS. 4, 5A and 5B, in some embodiments, the socket 24 comprises at least one seating surface 34 for seating a flat portion 36 of an end 18 of a double-ended lamp 16 thereon. In such embodiments, the socket 24 may further comprise a cover 38, hingedly coupled to the socket 24, such that the cover 38 may rotate between an open orientation, as shown in FIG. 5A, and a closed orientation, as shown in FIG. 5B, wherein the end 18 of the lamp 16 may be seated into the socket 24 while the cover 38 is open, and the cover 38 may be closed over the end 18 of the lamp 16 to prevent removal of the lamp 16 while the cover 38 is closed.

Figure 2:
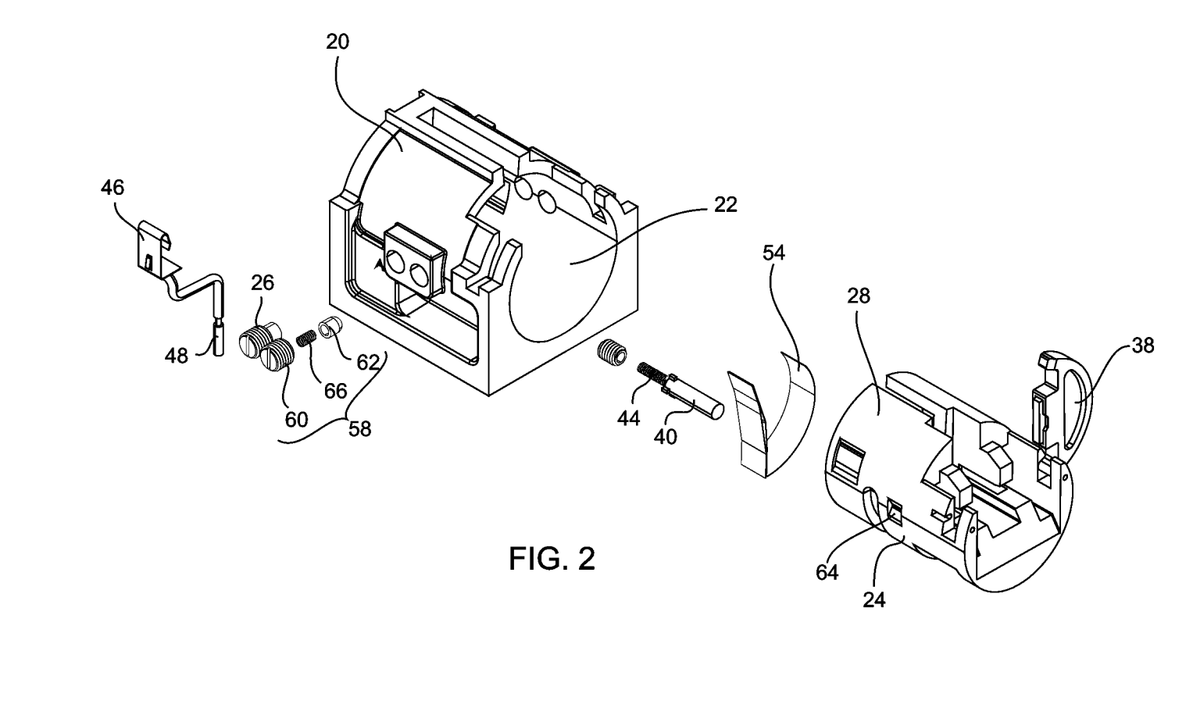
FIG. 2 is an exploded view of a socket assembly according to an embodiment.

In some embodiments, as shown in FIG. 4, each of the first and second socket assemblies, 12 and 14, further comprises at least one spring-loaded lamp-centering pin 40 coupled to the socket 24 of the first socket assembly 12, and at least one corresponding spring-loaded lamp-centering pin (not shown) coupled to the socket 24 of the second socket assembly 14, such that the end surface 42, as shown in FIG. 2, of the flat end 18 of a double-ended lamp 16 engages the spring-loaded lamp-centering pin 40. The spring 44, shown in FIG. 2, of the spring-loaded pin 40 may be compressed when a user seats the flat end 18 of the lamp 16 within the socket 24, in response to the end surface 42 engaging the spring-loaded pin 26. In similar fashion, the spring of the spring-loaded pin (not shown) of the opposed socket assembly is compressed when a user seats the opposed flat end of the lamp within the opposed socket (not shown). The lamp 16 is thereby maintained in a centered position between the first and second socket assemblies, 12 and 14, wherein the opposing spring forces are maintained in equilibrium.

In operation of an embodiment, a user may grasp the lamp 16 and thereby insert the flat ends 18 thereof within the sockets 24 of each of the first and second socket assemblies, 12 and 14, respectively, for seating the lamp 16 within the sockets 24 of the double-ended socket system 10. In an embodiment, the longitudinal axes of the lamp 16 and the sockets 24 are substantially aligned, and the sockets 24 cannot be rotated from a disengaged orientation to an engaged orientation unless both ends 18 of the lamp 16 are seated within the sockets 24 of the double-ended socket system 10, respectively. This is a safety feature that will become apparent in light of further explanation below. In embodiments comprising a cover 38, hingedly coupled to each of the sockets 24, as described above, the cover 38 may be closed by contact of the cover 38 with the housing 20, upon rotation of the lamp 16 by the user, without the need for the user to close the cover 38 by hand. In such embodiments, the socket 24 cannot be rotated unless the lamp end 18 is properly seated within the socket 24 such that the cover 38 may properly close as the lamp 16 is rotated. Embodiments of the invention thus allow a user to grasp a double-ended lamp 16 and easily install it into a double-ended socket system 10 using only one hand and without the use of any tools.

In an embodiment, the housing 20 is configured such that the cover 38 closes when the socket 24 is rotated a predetermined angle from the disengaged orientation. For example, the cover 38 may be open while in the disengaged orientation and be closed in response to engagement with the housing 20 upon rotation of the socket 24 a minimum angle of from 2 to 5 degrees. In such embodiments, the lamp 16 cannot be removed once the socket 24 is rotated beyond the minimum angle because the cover 38 will be closed, thereby preventing the lamp 16 from being removed.

One-handed removal of the lamp 16 from the socket system 10 is likewise easy to perform by reverse motion. For example, in reverse motion, the user may grasp the lamp 16 with one hand and first rotate the lamp 16 from the engaged orientation to the disengaged orientation. The covers 38 are then free to open, due to no longer being restricted by the housing 20, thereby allowing free removal of the lamp 16. The user may then remove the lamp 16 from the sockets 24.

Figure 7A:
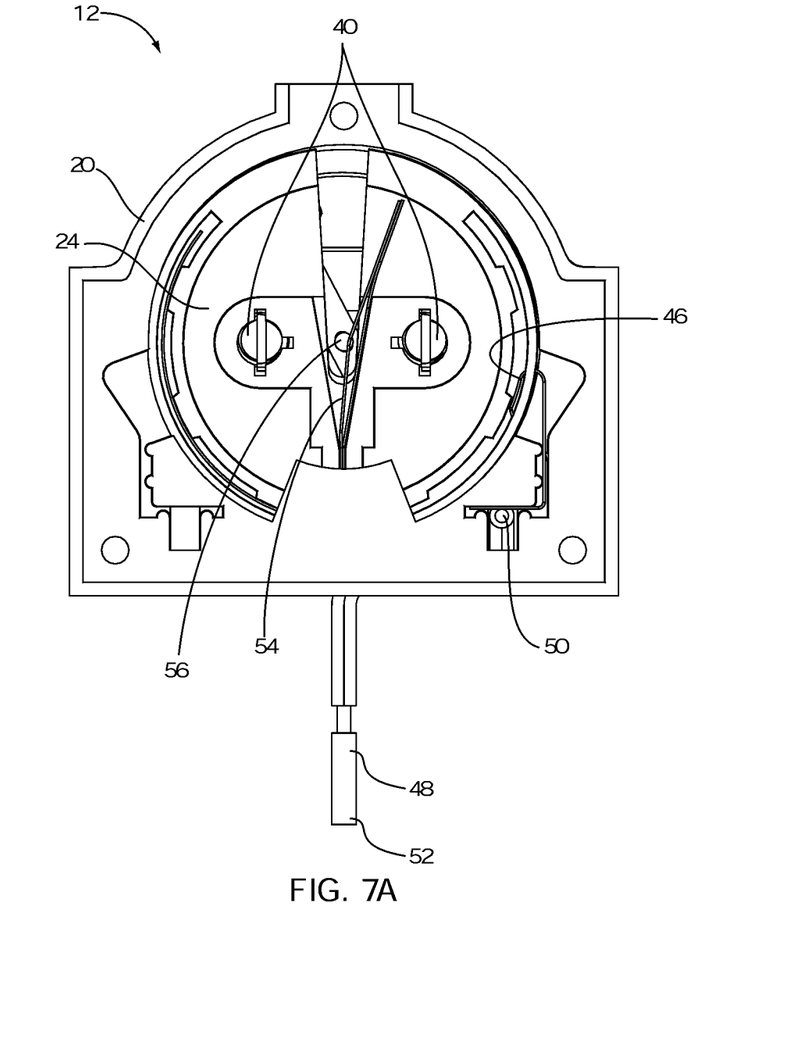
FIG. 7A is a rear view of a socket assembly in a disengaged orientation according to an embodiment.
Figure 7B:
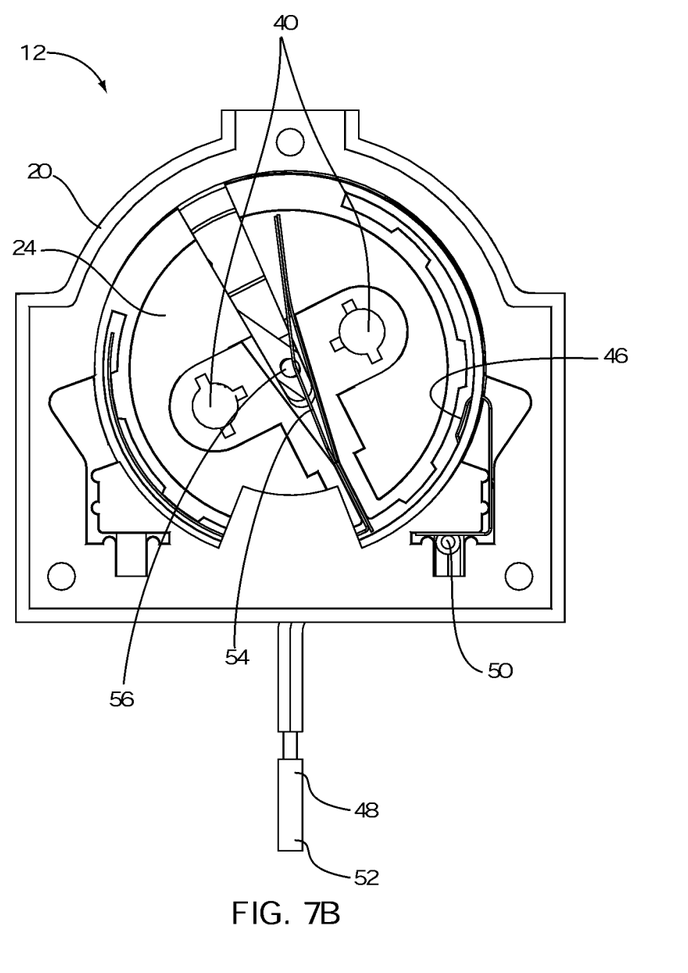
FIG. 7B is a rear view of a socket assembly in a partially-rotated orientation according to an embodiment.
Figure 7C:
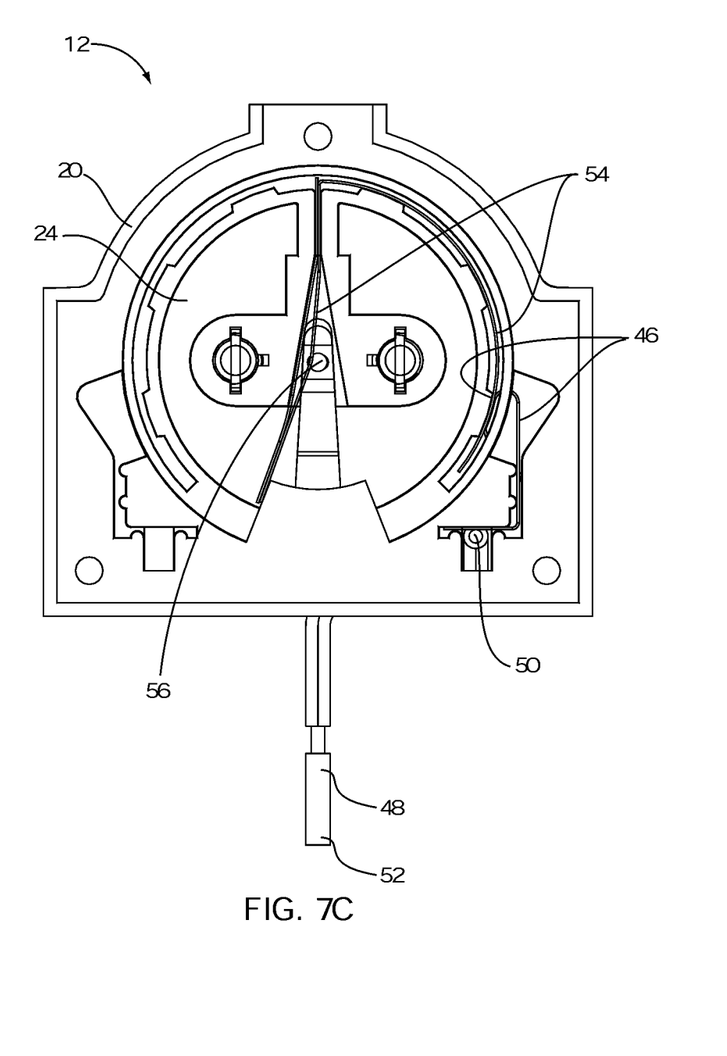
FIG. 7C is a rear view of a socket assembly in an engaged orientation according to an embodiment.

As shown in FIGS. 7A-7C, each of the first and second socket assemblies, 12 and 14, may further comprise a power contact 46 coupled to the housing 20 and coupled to a first end 50 of a power supply wire 48, wherein a second end 52 of the power supply wire 48 is coupled to an electrical power supply (not shown). Each of the first and second socket assemblies, 12 and 14, may further comprise a main contact 54 coupled to the socket 24, such that the main contact 54 engages the power contact 46 while in the engaged orientation, as shown in FIG. 7C, and the main contact 54 does not engage the power contact 46 while in the disengaged orientation, as shown in FIG. 7A. The main contact 54 may be configured such that it extends to the socket 24, wherein the electrical wire lead 56 of an end 18 of the lamp 16 engages the main contact 54 while the end 18 of the lamp 16 is seated within the socket 24, thereby maintaining electrical contact between the main contact 54 and the electrical wire lead 56.

In operation of embodiments, the lamp 16 is not energized while seated in the sockets 24 in the disengaged orientation, as shown in FIG. 7A. This is true whether the cover 38 is open, as shown in FIG. 5A, or closed, as shown in FIG. 5B. In such embodiments, it is only when the user rotates the lamp 16, such that the sockets 24 rotate to the engaged orientation, as shown in FIG. 7C, that electrical current flows from the electrical power source, through the power supply wire 48, to the power contact 46, and through the main contact 54 to the electrical wire lead 56 of an end 18 of the lamp 16. For example, in some embodiments, the lamp 16 is not energized until it has been rotated at least 60 degrees from the disengaged orientation. A circuit is thereby completed, as the current flows through the lamp 16 to an electrical wire lead 56 of the opposing end 18 of the lamp 16, and back to the power source through corresponding components of the opposed socket assembly 14, thereby energizing the lamp 16 to emit light. In embodiments in which the sockets 24 are not able to be rotated unless both ends 18 of the lamp 16 are seated within the sockets 24 of the double-ended socket system 10, respectively, the lamp 16 is thereby prevented from otherwise becoming energized. The electrical shock hazard of conventional double-ended socket systems, wherein a user may insert a first end of a lamp into an energized socket, thereby energizing the exposed electrical wire lead of the opposing end, is thus eliminated.

In an embodiment, each of the first and second socket assemblies, 12 and 14, is configured such that the electrical wire lead 56 of the end 18 of the lamp 16 is held straight and in contact with the main contact 54 thereof. For example, the main contact 54 may be spring-loaded, such that the main contact 54 remains biased against the electrical wire lead 56, as shown in FIGS. 6, 7A, 7B and 7C, thereby remaining in electrical contact with the electrical wire lead 56. The risk of electric arc discharge of conventional double-ended socket systems, wherein the electrical wire lead may be bent, or inadvertently or otherwise installed close to, but not in direct contact with, the main contact, is thus eliminated.

Each of the first and second socket assemblies, 12 and 14, may further comprise a snapping mechanism for snapping the socket 24 into the engaged orientation. For example, as shown in FIGS. 2 and 8, the assembly may comprise a ball detent 58 further comprising a spring-loaded ball piston 60, shown in FIG. 2, coupled to the housing such that the ball 62 thereof extends into and engages an indentation 64 on the socket 24 when the socket 24 is in the engaged orientation to hold the socket 24 in the engaged orientation with no other force, thereby snapping the socket 24 into the engaged orientation when the socket 24 is rotated to the engaged orientation. Then, the force of the spring 66 may be overcome to release the ball 62 from the indentation 64 in response to a user rotating the lamp 16 from the engaged orientation toward the disengaged orientation. In some embodiments, without limitation, the socket 24 will snap into an engaged orientation when the lamp 16 has been substantially rotated 180 degrees from the disengaged orientation. Similarly, the socket 24 may comprise a second indentation (not shown) disposed such that the socket 24 also snaps into the disengaged orientation. This snapping detent mechanism is not intended to be limiting. It should be understood that any of a number of detent mechanisms may be utilized to snap the socket into the engaged orientation or the disengaged orientation, such as other spring-loaded members, cam levers, notches, pin detents, ball detents, and the like.

Figure 9:
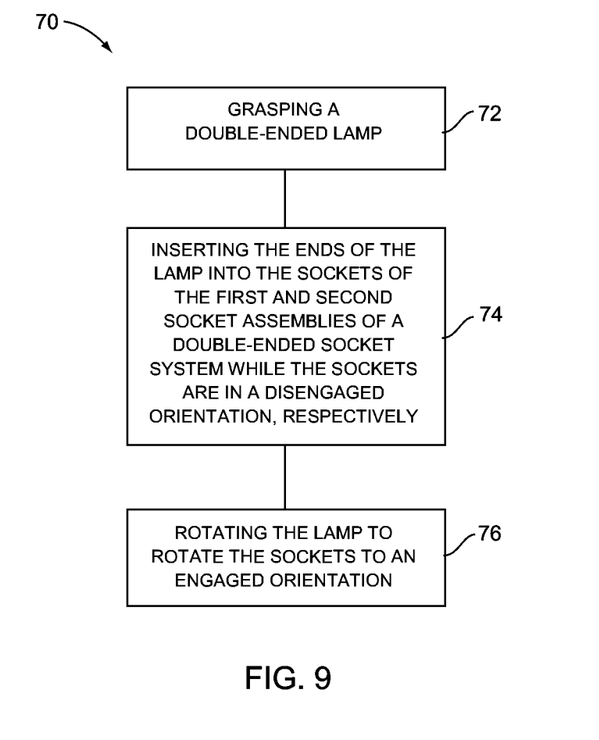
FIG. 9 is a flow diagram of a method of use of a double-ended lamp socket system according to an embodiment.

FIG. 9 illustrates a method 70 of using a double-ended socket system, comprising: grasping a double-ended lamp [Step 72]; inserting the ends of the lamp into the sockets of the first and second socket assemblies of a double-ended socket system while the sockets are in a disengaged orientation, respectively [Step 74]; and rotating the lamp to rotate the sockets to an engaged orientation [Step 76]. In embodiments, each and all of the steps of the method may be performed by a user by use of only one hand and no other tools. Further, in embodiments of the method, the lamp may be removed from the system only while the sockets are in a disengaged orientation. In some embodiments of the method, each of the first and second socket assemblies comprises a snapping mechanism for snapping the socket into the engaged orientation, the method further comprising snapping the socket into the disengaged orientation.

Although the previous embodiments are configured to receive an HID lamp 16, it should be appreciated that in alternative embodiments, other non-HID lamps having electrical contacts at opposing ends of the lamp may be employed.

Components of any double-ended socket system 10 that may be in contact with electrical circuitry are preferably formed of nonconductive materials, while electrical circuitry is formed of conductive materials. The components defining any double-ended socket system 10 may be formed of any of many different types of materials or combinations thereof that can readily be formed into shaped objects provided that the components selected are consistent with the intended operation of a double-ended socket system 10. For example, the components may be formed of: rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; any other suitable material; and/or any combination thereof.

Furthermore, the components defining any double-ended socket system 10 may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, sewing, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. A double-ended socket system comprising:
   a first socket assembly and a second socket assembly, each socket assembly comprising:
   a housing having a recess therein for housing a socket;
   a power contact coupled to the housing and a power supply wire coupled to an electrical power source;
   a socket housed within the recess of the housing and free to move within the recess between a disengaged orientation and an engaged orientation, the socket configured to seat an end of a lamp; and,
   a main contact coupled to the socket, the main contact engaging the power contact only while in the engaged orientation, wherein an electrical wire lead of the end of the lamp engages the main contact while the end of the lamp is seated within the socket, and wherein the socket is configured to move between the disengaged and engaged orientation responsive to movement of the lamp.

2. The double-ended socket system of claim 1, further comprising:
   a cover coupled to the socket and configured to move between an open orientation and a closed orientation, wherein the cover prevents removal of the lamp while in the closed orientation, and wherein the cover is configured to move into the closed orientation when the lamp is moved a minimum amount from the disengaged orientation.

3. The double-ended socket system of claim 2, wherein the movement of the lamp is rotational and the minimum amount is a rotation of the lamp from the disengaged orientation of at least 2 degrees.

4. A double-ended socket system comprising:
   a first socket assembly and a second socket assembly, the first and second socket assemblies further comprising:
   a housing having a substantially cylindrical recess therein for housing a socket;
   a power contact coupled to the housing and coupled to a first end of a power supply wire, wherein a second end of the power supply wire is coupled to an electrical power supply;
   a socket of substantially cylindrical shape housed within the recess of the housing such that the socket is free to rotate about the longitudinal axis thereof within the recess between a disengaged orientation and an engaged orientation, wherein the socket is configured to seat an end of a double-ended lamp such that the longitudinal axis of the lamp is substantially aligned with the longitudinal axis of the socket, wherein the socket may be rotated in response to a user rotating the lamp; and a main contact coupled to the socket, such that the main contact engages the power contact while in the engaged orientation and the main contact does not engage the power contact while in the disengaged orientation, wherein an electrical wire lead of the end of the lamp engages the main contact while the end of the lamp is seated within the socket, wherein the power contact is coupled to an electrical power supply such that electrical power is supplied to the lamp to emit light from the lamp while in the engaged orientation, and wherein the socket is in the engaged orientation only when rotated substantially 2 degrees or more from the disengaged orientation.

\* \* \* \* \*